United States Patent
Yoo et al.

(10) Patent No.: US 9,014,503 B2
(45) Date of Patent: Apr. 21, 2015

(54) NOISE-REDUCTION METHOD AND APPARATUS

(75) Inventors: Young-jin Yoo, Guri-si (KR); Ho-cheon Wey, Seongnam-si (KR); Seong-deok Lee, Suwon-si (KR)

(73) Assignees: Samsung Electronics Co., Ltd., Suwon-si (KR); Samsung Electro-Mechanics Co., Ltd., Suwon-si (KR)

( * ) Notice: Subject to any disclaimer, the term of this patent is extended or adjusted under 35 U.S.C. 154(b) by 1509 days.

(21) Appl. No.: 12/000,013

(22) Filed: Dec. 6, 2007

(65) Prior Publication Data

US 2009/0074318 A1    Mar. 19, 2009

(30) Foreign Application Priority Data

Sep. 14, 2007    (KR) .................. 10-2007-0093731

(51) Int. Cl.
*G06K 9/40*    (2006.01)
*G06T 5/00*    (2006.01)

(52) U.S. Cl.
CPC . *G06K 9/40* (2013.01); *G06T 5/002* (2013.01); *G06T 2207/20012* (2013.01); *G06T 2207/20192* (2013.01)

(58) Field of Classification Search
USPC ................................................ 382/256–259
See application file for complete search history.

(56) References Cited

U.S. PATENT DOCUMENTS 6,229,578 B1 *   5/2001   Acharya et al. ............... 348/607
6,999,634 B2     2/2006   Hong ............................ 382/275
2005/0025378 A1   2/2005   Maurer ......................... 382/260
2007/0133895 A1   6/2007   Kang et al. .................... 382/261
2008/0118173 A1 * 5/2008   Maurer ......................... 382/260

FOREIGN PATENT DOCUMENTS

| JP | 7-236140 | 9/1995 |
|---|---|---|
| JP | 10-327334 | 12/1998 |
| JP | 2000-331153 | 11/2000 |
| JP | 2006-229411 | 8/2006 |
| JP | 2006-295666 | 10/2006 |
| KR | 10-2005-0011241 | 1/2005 |

OTHER PUBLICATIONS

X.Z. Sun and Anastasios N. Venetsanopoulos, Adaptive Schemes for Noise Filtering and Edge Detection by Use of Local Statistics, IEEE 1988.*
John C Russ, The Image Processign Handbook, CRC Press 2002.*
White et al, Digital analysis of trabecular pattern in jaws of patients with sickle cell anemia, McMillan 2000.*

(Continued)

Primary Examiner — Mark Roz
(74) Attorney, Agent, or Firm — NSIP Law

(57) ABSTRACT

A noise-reduction method and apparatus are provided. The noise-reduction method includes estimating activity levels of regions in an input image; and applying different weights to a large noise filter kernel and a small noise filter kernel according to the estimated activity levels, wherein the estimating includes calculating a noise level of the input image, generating a binary image by calculating signal-to-noise ratios (SNRs) of pixels of the input image and by comparing the SNRs of the pixels of the input image with a predefined threshold, and reducing binary data boundaries in the binary image.

23 Claims, 8 Drawing Sheets

(56) References Cited

OTHER PUBLICATIONS

Marimont et al, A probabilistic Framework for Edge Detection and Scale Selection, IEEE 1998.*

StackOverflow.com, discussion on OpenCV Kernel size, May 2013.*

Lee, Digital Image Enhancement and Noise Filtering by Use of Local Statistics, IEEE Mar. 1980.*

Tom and Carlotto, Adaptive Least-Squares Technique for Multi-Band Image Enhancement, IEEE 1985.*

Liu, C. et al., "Noise Estimation from a Single Image," Proceedings of the 2006 IEEE Computer Society Conference on Computer Vision and Pattern Recognition (8 pages).

Shin, D. et al., "Block-Based Noise Estimation Using Adaptive Gaussian Filtering," IEEE Transactions on Consumer Electronics, vol. 51, No. 1, pp. 218-226, Feb. 2005.

Korean Office Action mailed Sep. 10, 2013 in related Korean Application No. 10-2007-0093731.

* cited by examiner

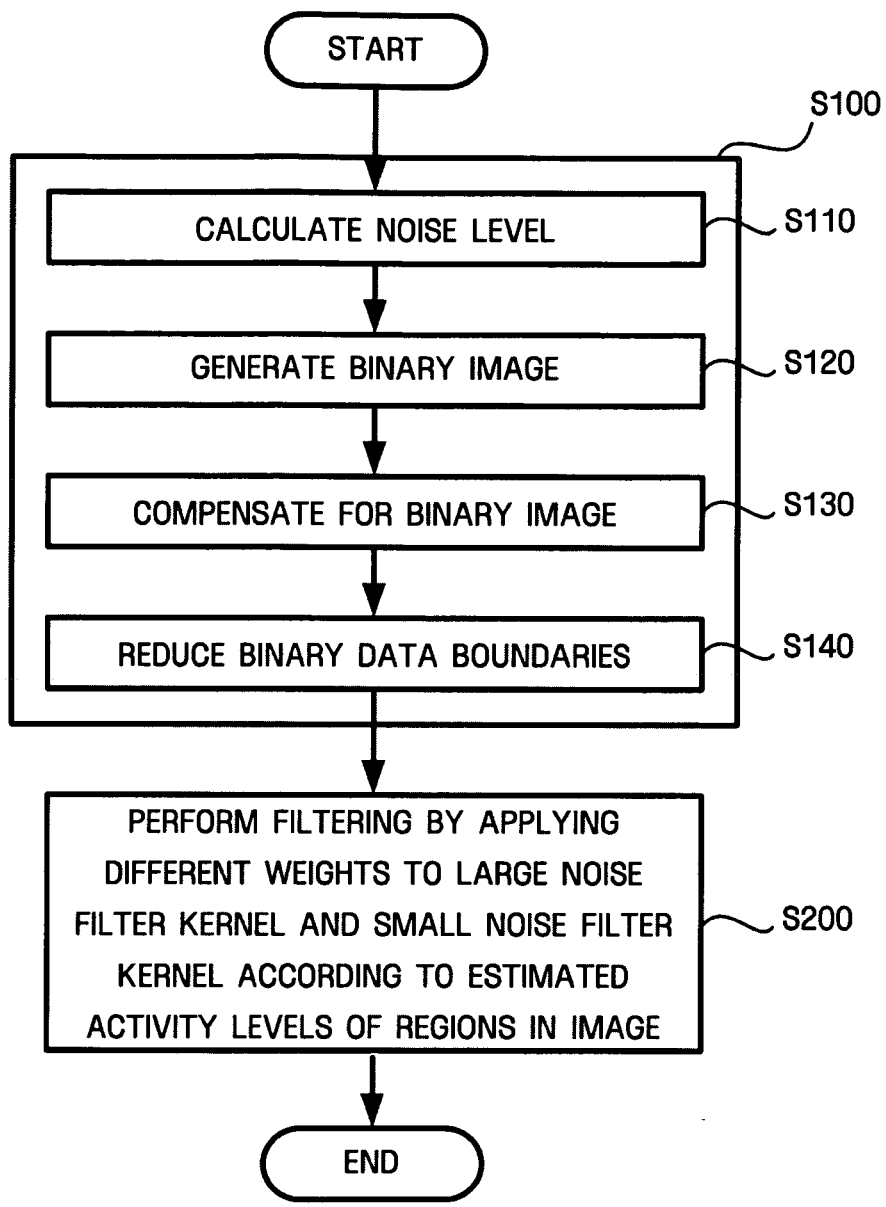

NOISE-REDUCTION METHOD AND APPARATUS

CROSS-REFERENCE TO RELATED APPLICATION

This application claims priority from Korean Patent Application No. 10-2007-0093731 filed on Sep. 14, 2007 in the Korean Intellectual Property Office, the disclosure of which is incorporated herein by reference in its entirety.

BACKGROUND OF THE INVENTION

1. Field of the Invention

The present invention relates to a noise-reduction method and apparatus, and, more particularly, to a noise-reduction method and apparatus in which it is possible to prevent the occurrence of edge artifacts by applying different filter weights according to the activity levels of regions in an image, and in which it is also possible to prevent the occurrence of an outlier phenomenon by applying different filter weights according to outlier probabilities.

2. Description of the Related Art

A high-sensitivity photographing function is generally required to perform photographing in a low-illumination environment and during night time. In recent years, the demand for the high-sensitivity photographing function has steadily grown.

One of the major drawbacks of the high-sensitivity photographing function is that noise is amplified when using the high-sensitivity photographing function. Much research has been conducted on ways to reduce noise.

Noise-reduction methods using the discrete cosine transform (DCT) or wavelet transform can achieve high noise-reduction performance. However, such DCT- or wavelet transform-based noise-reduction methods are highly likely to generate ringing artifacts along edges in an image when being used to transform the frequency properties of the image. In addition, it is very complicated to apply such DCT- or wavelet transform-based noise-reduction methods to typical cameras.

Noise-reduction methods such as a total variation optimization method using iteration and an anisotropic diffusion method can also achieve high noise-reduction performance, but it is difficult to apply them to typical cameras. Moreover, the total optimization method and the anisotropic diffusion method require a considerable amount of hardware resources.

Spatial filters, however, generally have a low level of complexity and require less hardware resources. Thus, spatial filers have been widely used in cameras for reducing noise. Examples of spatial filters include Wiener/minimum mean square error (MMSE) filters ("Method of Filtering Image Noise using Pattern Information," US 2007/0133895 A1 and "Spatio-Temporal Joint Filter for Noise Reduction," U.S. Pat. No. 6,999,634 B2), sigma filters (J. S. Lee, Digital Image Smoothing and the Sigma Filter, 1983), and bilateral filters (C. Tomasi, R. Manduchi, Bilateral Filtering for Gray and Color Images, 1998, Method for Bilateral Filtering of Digital Images US 2005.0025378). However, spatial filters may produce edge artifacts and outliers (also referred to as impulse noise), which appear in an image as dots, when being used to reduce noise caused by high-sensitivity photography.

FIG. 1 illustrates edge artifacts caused by the use of a conventional Weiner filter, and FIG. 2 illustrates outliers caused by the use of a conventional Sigma filter.

Referring to FIG. 1, edges in an image obtained using a Wiener filter appear unclear and are distorted. Referring to FIG. 2, an image obtained using a Sigma filter includes many outliers which appear as dots.

SUMMARY OF THE INVENTION

The present invention provides a noise-reduction method and apparatus in which it is possible to prevent the occurrence of edge artifacts by estimating the activity levels of regions in an image and applying different weights to a large noise filter kernel and a small noise filter kernel based on the results of the estimation, and in which it is also possible to prevent the occurrence of outliers by applying to an order statistics filter kernel a different weight from the weights respectively applied to the large noise filter kernel and the small noise filter kernel according to outlier probabilities.

However, the objectives of the present invention are not restricted to the one set forth herein. The above and other objectives of the present invention will become apparent to one of daily skill in the art to which the present invention pertains by referencing the detailed description of the present invention given below.

According to an aspect of the present invention, there is provided a noise-reduction method including estimating activity levels of regions in an input image; and applying different weights to a large noise filter kernel and a small noise filter kernel according to the estimated activity levels, wherein the estimating includes calculating a noise level of the input image, generating a binary image by calculating signal-to-noise ratios (SNRs) of pixels of the input image and by comparing the SNRs of the pixels of the input image with a predefined threshold, and reducing binary data boundaries in the binary image.

According to another aspect of the present invention, there is provided a noise-reduction apparatus including a noise-level-estimation module which calculates a noise level of an input image; a binary-image-generation module which generates a binary image by calculating SNRs of pixels of the input image and comparing the SNRs of the pixels of the input image with a predefined threshold; a boundary-effect-reduction module which reduces binary data boundaries in the binary image generated by the binary-image-generation module; and an activity level-based weight adjustment module which applies different weights to a large noise filter kernel and a small noise filter kernel according to activity levels of regions in a binary image obtained by the reduction performed by the boundary-effect-reduction module.

BRIEF DESCRIPTION OF THE DRAWINGS

The above and other features and advantages of the present invention will become apparent by describing in detail preferred embodiments thereof with reference to the attached drawings in which:

FIG. 3 illustrates a flowchart of a noise-reduction method according to an embodiment of the present invention;

DETAILED DESCRIPTION OF THE INVENTION

Figure 1:
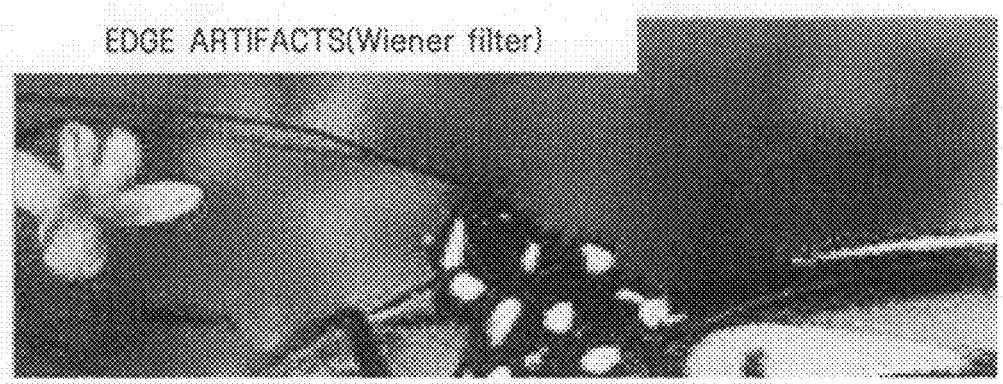
FIG. 1 illustrates edge artifacts caused by the use of a conventional Weiner filter.
Figure 2:
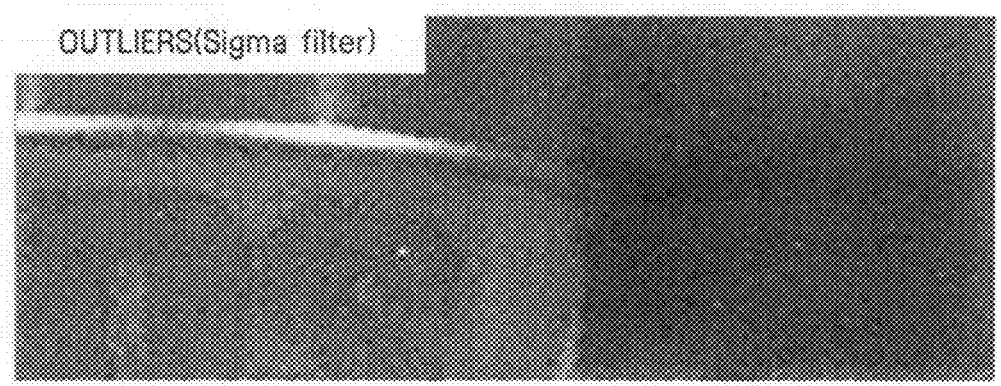
FIG. 2 illustrates outliers caused by the use of a conventional Sigma filter.

The present invention will now be described more fully with reference to the accompanying drawings, in which exemplary embodiments of the invention are shown.

The invention may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals in the drawings denote like elements, and thus their description will be omitted.

The present invention is described hereinafter with reference to flowchart illustrations of user interfaces, methods, and computer program products according to embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

FIG. 3 illustrates a flowchart of a noise-reduction method according to an embodiment of the present invention. Referring to FIG. 3, the noise-reduction method includes estimating the activity levels of regions in an input image (S100) and performing filtering by applying different weights to a large noise filter kernel and a small noise filter kernel according to the results of the estimation.

The activity levels of regions in an image are numerical values indicating the level of importance of information of each pixel of the image. In general, edges in an image that allow a user to recognize an object in the image have high activity levels. The estimation of the activity levels of regions in the input image may be performed in the following manner.

First, a noise level of the input image is calculated S110. Various methods of estimating the noise level of an image have been suggested based on the fact that noise of an image sensor generally has signal-dependant properties, and thus varies according to the type of photographing environment and the properties of the image sensor. Examples of the various noise-estimation methods are disclosed in "Block-based Noise Estimation Using Adaptive Gaussian Filtering, D. H. Shin et al., IEEE Trans. On Consumer Electronics, Vol. 51, No. 1, February 2005," and "Noise Estimation from a Single Image, C. Liu et al., Proceedings of the 2006 IEEE Computer Society Conference on CVPR'06." However, the present invention is not restricted to those set forth herein.

After the calculation of the noise level of the input image, signal-to-noise ratios (SNRs) of pixels of the input image are calculated, and a binary image is generated by comparing the SNRs of the pixels of the input image with a predefined threshold S120. Specifically, pixels of the input image with SNRs higher than the predefined threshold are set to a value of 1, and pixels of the input image with SNRs lower than the predefined threshold are set to a value of 0. Pixels set to the value of 0 may be interpreted as including important information and corresponding to edges in the input image. The SNR of a pixel of the input image may be calculated using statistical data of a local region including the pixel and using a standard deviation (STD) method, a mean-of-absolute-difference (MAD) method, or a sum-of-absolute-difference (SAD) method.

Figure 4A:
FIG. 4A illustrates an original image including noise.
Figure 4B:
FIG. 4B illustrates a binary image obtained by comparing signal-to-noise ratios (SNRs) of pixels of the original image illustrated in FIG. 4A with a predefined threshold.

FIG. 4A illustrates an original image including noise, and FIG. 4B illustrates a binary image obtained by calculating the SNRs of pixels of the original image and comparing the SNRs of the pixels of the original image with a predefined threshold. Referring to FIG. 4B, bright portions of the binary image have a value of 1, whereas dark areas of the binary image have a value of 0. Specifically, most edges in the binary image have a value of 1.

The greater the number of samples used (i.e., the larger the area of a local region including a predetermined pixel), the more precise the statistical data regarding the predetermined pixel becomes. However, if there are too many samples used, the activity levels of regions in an image may be overestimated. In this case, a binary image resulting from the overestimation of the activity levels of regions in an image may be compensated for S130. When the activity levels of regions in an image are overestimated, not only edges in the image but also portions near the edges are set to a value of 1. A binary image resulting from the overestimation of the activity levels of regions in an image may be compensated for using a morphological thinning method.

Figure 4C:
FIG. 4C illustrates a binary image obtained by compensating for the binary image of FIG. 4B.

FIG. 4C illustrates a binary image obtained by compensating for the binary image of FIG. 4B using the morphological thinning method. Active regions (i.e., regions set to a value of 1) in the binary image of FIG. 4C are generally thinner than their respective counterparts in the binary image of FIG. 4B.

That is, regions in the binary image of FIG. 4B that are determined to be active regions due to an overestimation of the activity levels of regions in the original image of FIG. 4A are transformed into inactive regions having a value of 0 through compensation.

Referring to FIG. 3, binary data boundaries are reduced in the binary image obtained in operation S120 (S140). Since each pixel of a binary image has a value of 0 or 1, regions in a binary image are simply classified into active regions having the value of 1 and inactive regions having the value of 0. Therefore, portions of a binary image drastically change along binary data boundaries and may thus appear unnatural. This phenomenon is referred to as a boundary effect. In order to reduce a boundary effect, the values of pixels of a binary image may be converted into values between 0 and 1. Specifically, a Gaussian blur may be used to reduce a boundary effect.

Figure 4D:
FIG. 4D illustrates a binary image obtained by reducing binary data boundaries from the binary image of FIG. 4C.

FIG. 4D illustrates a binary image obtained by reducing boundary data boundaries from the binary image of FIG. 4C. The binary image of FIG. 4D is smoother than the image of FIG. 4C because the values of the pixels of the binary image of FIG. 4D range from 0 to 1 due to the reduction of a boundary effect, whereas the values of the pixels of the binary image of FIG. 4C are either 0 or 1. Referring to FIG. 4D, bright portions of the binary image may have a value of 1 or a value close to 1, whereas dark portions of the binary image may have a value of 0 or a value close to 0.

Referring to FIG. 3, once the activity levels of the regions in the input image are estimated in operation S100, filtering is performed by applying different weights to a large noise filter kernel L and a small noise filter kernel S according to the results of the estimation performed in operation S100 (S200). Then, the results of filtering performed using the large noise filter kernel and the small noise filter kernel, respectively, are added up, thereby generating an image with reduced edge artifacts. If a weight g (where $0 \leq g \leq 1$) is applied to the large noise filter kernel, a weight $(1-g)$ may be applied to the small noise filter kernel. In this case, a final image obtained by performing filtering using the large noise filter kernel and the small noise filter kernel may be represented by $gL+(1-g)S$. If the active levels of the regions in the input image are high, a higher weight is applied to the small noise filter kernel than to the large noise filter kernel, thereby improving the efficiency of the reduction of edge artifacts.

Conventional noise-reduction methods may result in outliers when being used to reduce noise in an image obtained by high-sensitivity photographing. In order to address this, the noise-reduction method of the embodiment of FIG. 3 may also include the following operations.

An image is generated by applying to an order statistics filter kernel a different weight from the weights respectively applied to a large noise filter kernel and a small noise filter kernel. Order statistics filtering is very efficient for reducing outliers. In order to reduce outliers while minimizing damage to the details of an image, an image obtained by applying different weights to a large noise filter kernel and a small noise filter kernel and an image obtained by applying to an order statistics filter kernel a different weight from the weights respectively applied to the large noise filter kernel and the small noise filter kernel may be added up. A median filter may be used as an order statistics filter.

An outlier probability is the probability of a pixel of an image being an outlier. An outlier probability may be calculated based on a minimum deviation between information of a pixel of an image and information of a local region including the pixel, but the present invention is not restricted to this.

Figure 5:
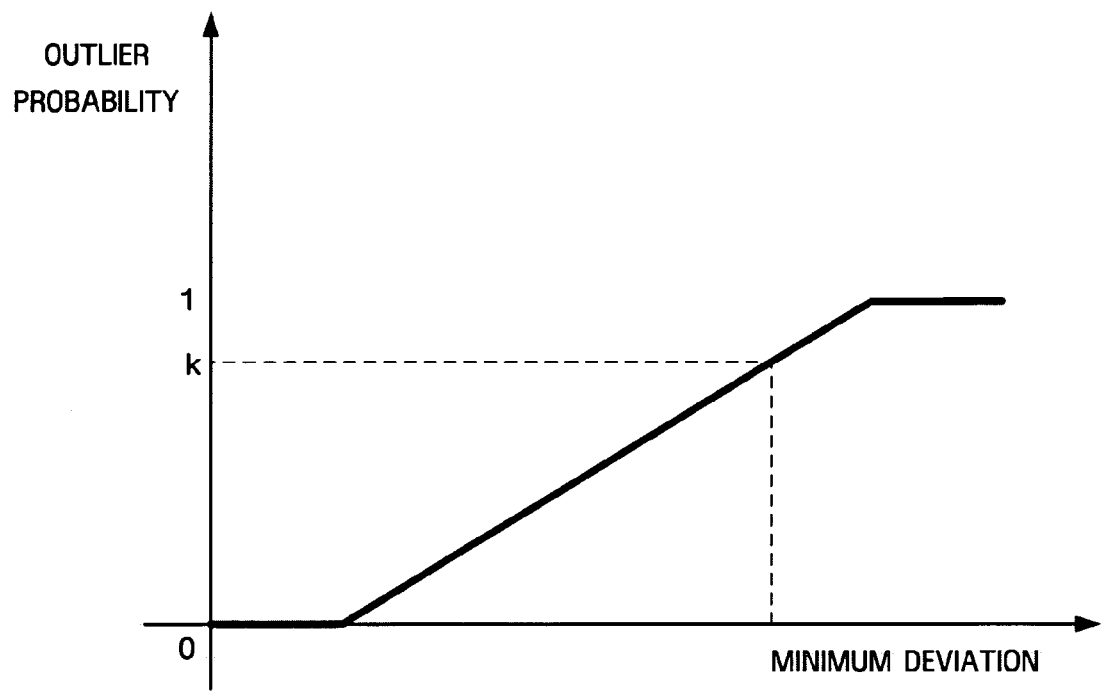
FIG. 5 illustrates a graph of the relationship between a minimum deviation of an order statistics filter kernel and an outlier probability.

FIG. 5 illustrates a graph of the relationship between a minimum deviation of an order statistics filter kernel and an outlier probability. Referring to FIG. 5, a minimum deviation of an order statistics filter kernel and an outlier probability have a linear relationship. For a predetermined order statistics filter kernel minimum deviation corresponding to an outlier probability of k (where $0 \leq k \leq 1$), the weight of the order statistics filter kernel is set to k. An image obtained by applying the weight k to an order statistics filter kernel may be represented by $kO+(1-k)(gL+(1-g)S)$ where O, L, and S indicate an order statistics filter kernel, a large noise filter kernel and a small noise filter kernel, respectively. That is, the higher the outlier probability, the higher the weight applied to a filter for reducing outliers. In contrast, the lower the outlier probability, the higher weight applied to a filter for reducing edge artifacts.

Figure 6:
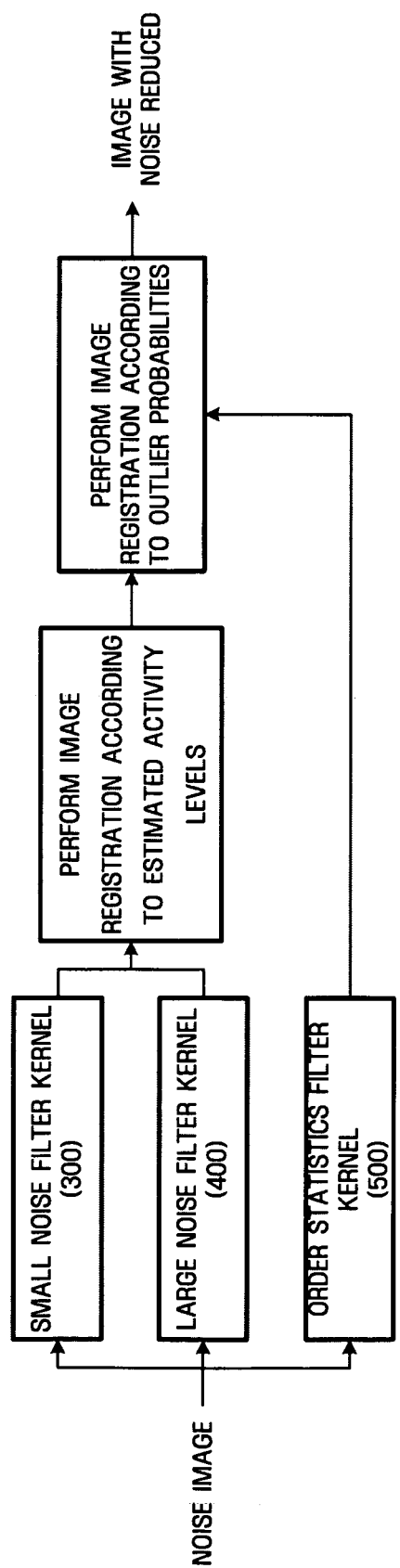
FIG. 6 illustrates a filter structure of a noise-reduction apparatus, according to an embodiment of the present invention.

FIG. 6 illustrates a filter structure of a noise-reduction apparatus according to an embodiment of the present invention. Referring to FIG. 6, the filter structure may include a small noise filter kernel 300 and a large noise filter kernel 400. The filter structure may also include an order statistics filter kernel 500 for removing outliers selectively from an image. When an image including noise is received, the activity levels of regions in the image are calculated, and images are obtained by applying different weights to the large noise filter kernel 400 and the small noise filter kernel 300 according to the results of the calculation. Thereafter, the images are added, thereby preventing the occurrence of edge artifacts. In order to reduce outliers from an image, the filter structure may also include the order statistics filter kernel 500. A different weight from the weights respectively applied to the large noise filter kernel 400 and the small noise filter kernel 300 is applied to the order statistics filter kernel 500, thereby preventing the occurrence of outliers.

Figure 7:
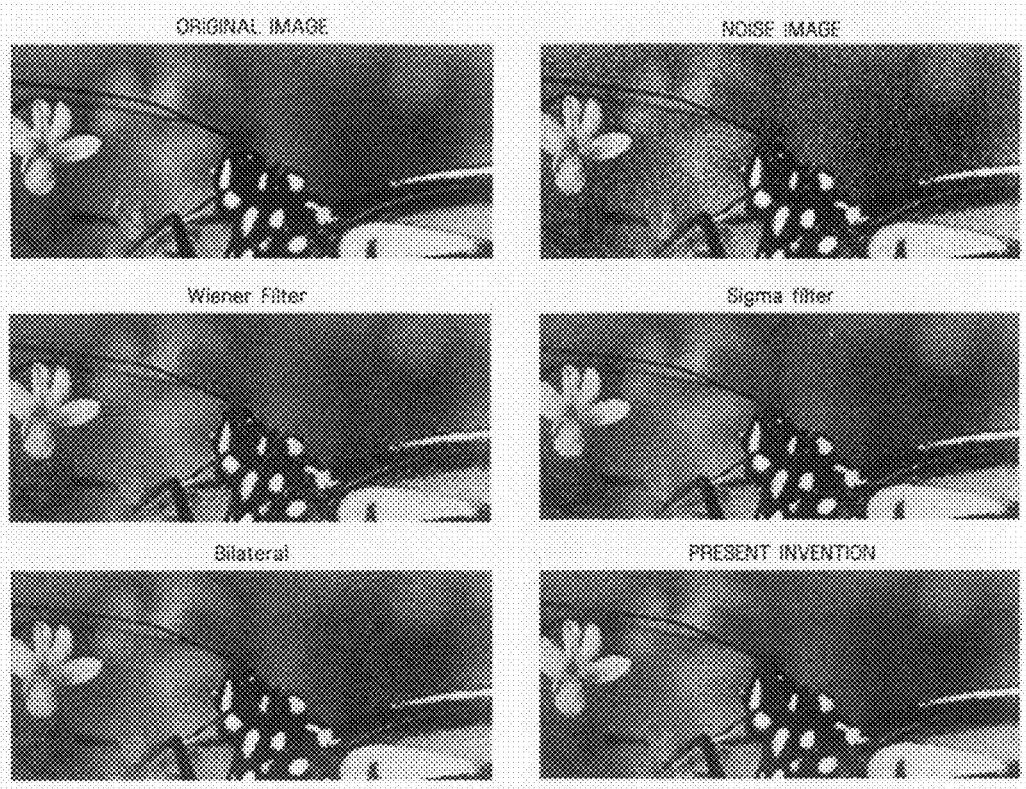
FIG. 7 compares an image obtained using the filter structure illustrated in FIG. 6 with images obtained using conventional spatial filters.
Figure 8:
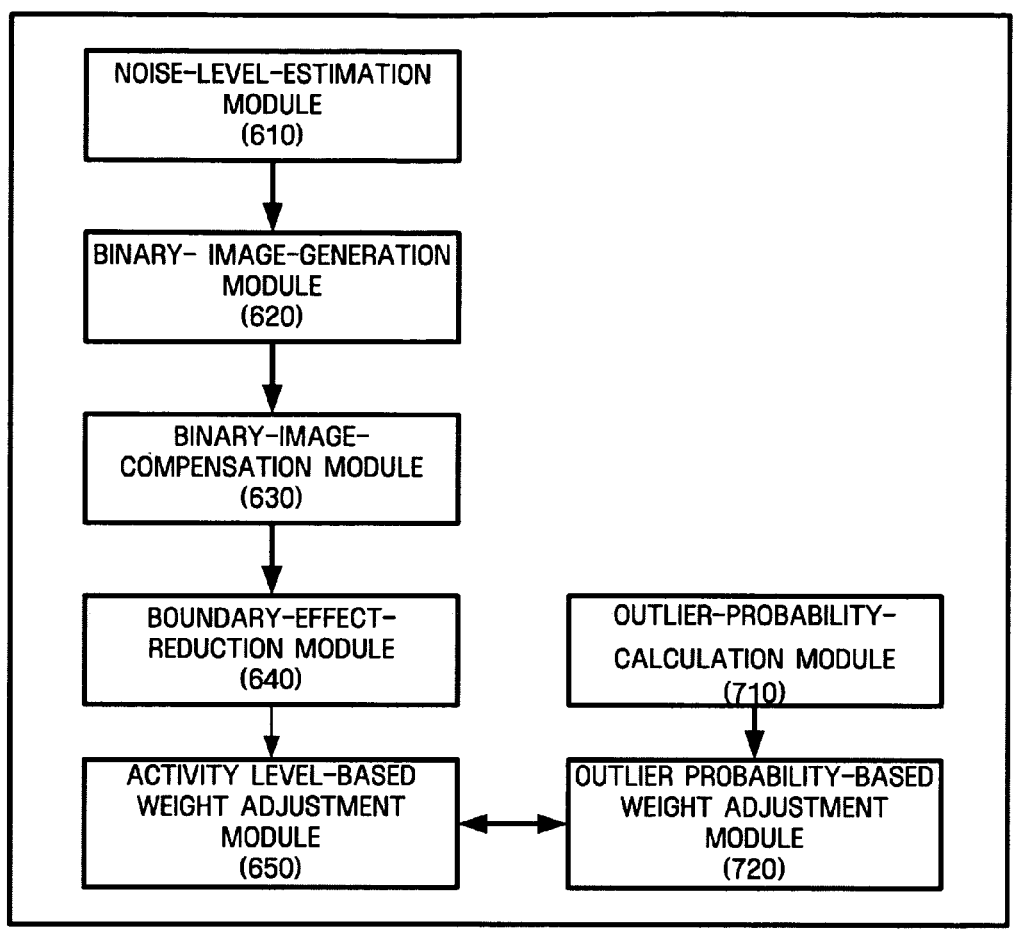
FIG. 8 illustrates a block diagram of a noise-reduction apparatus according to an embodiment of the present invention.

FIG. 7 compares an image obtained using a filter structure according to an embodiment of the present invention with images obtained using conventional spatial filters. Specifically, FIG. 7 presents an original image without noise, a noise image obtained by an image-capturing apparatus, an image obtained by processing the noise image using a Wiener filter, an image obtained by processing the noise image using a Sigma filter, an image obtained by processing the noise image using a bilateral filter, and an image obtained by processing the noise image using the filter structure illustrated in FIG. 6. Referring to FIG. 7, the images obtained using a Wiener filter, a Sigma filter or a bilateral filter have less noise than the noise image but still include edge artifacts and outliers. In contrast, the image obtained using the filter structure illustrated in FIG. 6 has fewer edge artifacts and fewer outliers than the images obtained using the Wiener filter, Sigma filter or bilateral filter FIG. 8 illustrates a block diagram of a noise-reduction apparatus according to an embodiment of the present invention. Referring to FIG. 8, the noise-reduction apparatus includes a noise-level-estimation module 610, a binary-image-generation module 620, a binary-image-compensation module 630, a boundary-effect-reduction module 640 and an activity level-based weight adjustment module 650. The noise-reduction apparatus may also include an outlier-probability-calculation module 710 and an outlier probability-based weight adjustment module 720.

The term "module", as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Referring to FIG. 8, the noise-reduction apparatus may be used in an image-capturing apparatus such as a digital camera, a camcorder, or a camera phone. The noise-reduction apparatus may be incorporated with an image-capturing apparatus. Alternatively, the noise-reduction apparatus may be separate from an image-capturing apparatus and may be connected to the image-capturing apparatus via a wired or wireless interface, for example, a universal serial bus (USB), a Bluetooth interface or an IEEE 1394 interface. However, the present invention is not restricted to this.

The noise-level-estimation module 610 calculates a noise level of an input image including noise.

The binary-image-generation module 620 calculates SNRs of pixels of the input image using the noise level of the input image and generates a binary image by comparing the SNRs of the pixels of the input image with a predefined threshold.

If the binary-image-generation module 620 uses too many samples for generating a binary image, the activity levels of regions in the input image may be overestimated. In this case, the binary-image-compensation module 630 may compensate for a binary image generated by the binary-image-generation module 620 so that a boundary effect of the binary image can be reduced. The binary-image-compensation module 630 may use a morphological thinning method to compensate for the binary image generated by the binary-image-generation module 620.

In order to prevent drastic activity level changes due to the characteristics of binary data, the boundary-effect-reduction module 640 reduces binary data boundaries so that binary values can be converted into values between 0 and 1. Specifically, the boundary-effect-reduction module 640 may use a Gaussian blur to reduce a boundary effect.

The activity level-based weight adjustment module 650 applies different weights to a large noise filter kernel and a small noise filter kernel according to the activity levels of regions in an image generated by the boundary-effect-reduction module 640. If the activity levels of the regions in the image generated by the boundary-effect-reduction module 640 are high, the activity level-based weight adjustment module 650 may apply a higher weight to the small noise filter kernel than to the large noise filter kernel.

Images obtained by applying different weights to the large noise filter kernel and the small noise filter kernel may be added, thereby generating an image with reduced edge artifacts.

In order to reduce outliers, the image-registration apparatus may include the outlier-probability-calculation module 710 and the outlier probability-based weight adjustment module 720.

The outlier-probability-calculation module 710 calculates an outlier probability of each pixel of an image, i.e., the probability of each pixel being an outlier. An outlier probability may be calculated using a minimum deviation of an order statistics filter kernel.

The outlier probability-based weight adjustment module 720 applies, to an order statistics filter kernel, a different weight from the weights respectively applied to the large noise filter kernel and the small noise filter kernel by the activity level-based weight adjustment module 650 according to the outlier probabilities calculated by the outlier-probability-calculation module 710. If the outlier probabilities calculated by the outlier-probability-calculation module 710 are high, a higher weight may be applied to the order statistics filter kernel than to the large or small noise filter kernel.

As described above, according to the present invention, it is possible to prevent the occurrence of edge artifacts by applying different filter weights according to the activity levels of regions in an image.

In addition, it is possible to prevent the occurrence of outliers by applying different filter weights according to outlier probabilities.

While the present invention has been particularly shown and described with reference to exemplary embodiments thereof, it will be understood by those of ordinary skill in the art that various changes may be made to the form and details without departing from the spirit and scope of the present invention as defined by the following claims.

What is claimed is:

1. A noise-reduction method comprising:
    estimating activity levels of regions in an input image, wherein each region comprises a plurality of pixels;
    filtering the plurality of pixels of a region of the regions in the input image by applying different weights with a large noise filter kernel and a small noise filter kernel according to the estimated activity levels of the regions to obtain a first filtered result of the region,
    wherein when a weighting of one is applied, output values of the large noise filter kernel and the small noise filter kernel are different than input values of the large noise filter kernel and the small noise filter kernel, respectively, and
    wherein the estimating of the activity levels of the regions comprises calculating a noise level of the input image, generating a binary image by calculating signal-to-noise ratios (SNRs) of the plurality of pixels of the input image and by comparing the SNRs of the plurality of pixels of the input image with a predefined threshold, and reducing binary data boundaries in the binary image;
    filtering the plurality of pixels of a region using the large noise filter kernel and the small noise filter kernel with the different weights applied to the large noise filter kernel and the small noise filter kernel, to obtain a first filtered result; and
    performing filtering of the plurality of pixels of the region using an order statistics filter kernel by applying to the order statistics filter kernel an another different weight that is different from the weights respectively applied to the large noise filter kernel and the small noise filter kernel,
    wherein the another different weight, which is multiplied with the order statistic filter, is different from weights respectively applied to the noise filter kernel and the small noise filter kernel,
    wherein the another different weight, which is multiplied with the order statistic filter kernel, is determined according to outlier probabilities of the pixels of the input image, and
    wherein, when the probabilities of the pixels of the input image being an outlier increases, a weight having a value k applied to the order statistics filter kernel increases and a weight having a value (1−k) applied to the large noise filter kernel and small noise filter kernel decreases.

2. The noise-reduction method of claim 1, wherein the generating comprises compensating for the binary image if the binary image results from an overestimation of the activity levels of the regions in the input image.

3. The noise-reduction method of claim 2, wherein the compensating comprises compensating for the binary image using a morphological thinning method.

4. The noise-reduction method of claim 1, wherein the reducing comprises reducing the binary data boundaries using a Gaussian blur.

5. The noise-reduction method of claim 1, wherein the applying the different weights to the large noise filter and the small noise filter kernel comprises applying a higher weight to the small noise filter kernel than to the large noise filter kernel when the estimated activity levels of the regions have a value of one or about one.

6. The noise-reduction method of claim 1, wherein the order statistics filter kernel comprises a median filter.

7. The noise-reduction method of claim 1, wherein the performing comprises calculating the outlier probabilities of the pixels of the input image using a minimum deviation of the order statistics filter kernel.

8. The noise-reduction method of claim 7, wherein the performing the filtering comprises applying a higher weight to the order statistics filter kernel than to the large noise filter kernel and the small noise filter kernel when the probability of the pixels of the input image being an outlier are greater than a predetermined threshold.

9. A noise-reduction apparatus comprising:
a processor comprising:
a noise-level-estimation module which calculates a noise level of an input image;
a binary-image-generation module which generates a binary image by calculating signal-to-noise ratios (SNRs) of pixels of the input image and compares the SNRs of the pixels of the input image with a predefined threshold;
a boundary-effect-reduction module which reduces binary data boundaries in the binary image generated by the binary-image-generation module;
an activity level-based weight adjustment module which applies different weights to a large noise filter kernel and a small noise filter kernel according to activity levels of regions in a binary image obtained by the reduction performed by the boundary-effect-reduction module, wherein each region comprises a plurality of pixels;
a filter module to filter the plurality of pixels of a region using the large noise filter kernel and the small noise filter kernel with the different weights applied to the large noise filter kernel and the small noise filter kernel, to obtain a first filtered result,
wherein when a weighting of one is applied, output values of the large noise filter kernel and the small noise filter kernel are different than input values of the large noise filter kernel and the small noise filter kernel, respectively;
an outlier-probability-calculation module which calculates probabilities of the pixels of the input image;
an order statistics filter kernel to perform filtering of the plurality of pixels of the region; and
an outlier probability-based weight adjustment module which applies to the order statistics filter kernel the another different weight that is different from the weights respectively applied to the large noise filter kernel and the small noise filter kernel according to the outlier probabilities of the pixels of the input image to obtain the second filtered result of the filtered plurality of pixels of the region, wherein, when the probability of the pixels of the input image being an outlier increases, a weight having a value k applied to the order statistics filter kernel increases and a weight having a value (1−k) applied to the large noise filter kernel and small noise filter kernel decreases.

10. The noise-reduction apparatus of claim 9, further comprising a binary-image-compensation module which compensates for the binary image generated by the binary-image-generation module if the binary image generated by the binary-image-generation module results from an overestimation of the activity levels of the regions in the input image.

11. The noise-reduction apparatus of claim 10, wherein the binary-image-compensation module uses a morphological thinning method.

12. The noise-reduction apparatus of claim 9, wherein the boundary-effect-reduction module uses a Gaussian blur.

13. The noise-reduction apparatus of claim 9, wherein the activity level-based weight adjustment module applies a higher weight to the small noise filter kernel than to the large noise filter kernel when the estimated activity levels of the regions have a value of one or about one.

14. The noise-reduction apparatus of claim 9, wherein the order statistics filter kernel comprises a median filter.

15. The noise-reduction apparatus of claim 9, wherein the outlier-probability-calculation module calculates the outlier probabilities of the pixels of the input image using a minimum deviation of the order statistics filter kernel.

16. The noise-reduction apparatus of claim 15, wherein the outlier-probability-calculation module applies a higher weight to the order statistics filter kernel than to the large noise filter kernel and the small noise filter kernel when the probability of the pixels of the input image being an outlier are greater than a predetermined threshold.

17. The noise-reduction method of claim 1, further comprising generating images obtained from the applying different weights to the large noise filter kernel and the small noise filter kernel, and adding the generated images.

18. The noise-reduction method of claim 1, wherein the reducing binary data boundaries in the binary image comprises converting values of pixels of the binary image to a value between zero and one.

19. The noise-reduction apparatus of claim 9, wherein the activity level-based weight adjustment module generates images obtained from the application of the different weights to the large noise filter kernel and the small noise filter kernel, and adds the generated images to generate an image with reduced edge artifacts.

20. The noise-reduction apparatus of claim 9, wherein the boundary-effect-reduction module reduces binary data boundaries in the binary image generated by the binary-image-generation module by converting values of pixels of the binary image to a value between zero and one.

21. At least one non-transitory computer readable medium storing computer readable instructions that control at least one processor to perform the method of claim 1.

22. The noise-reduction method of claim 1,
wherein combining the first filtered result with the second filtered result of the pixel further comprises adding the first filtered result of the pixel with the second filtered result of the pixel to obtain a pixel of the input image with reduced noise, and
wherein regions which include at least one edge correspond with regions with high activity levels.

23. The noise-reduction method of claim 9,
wherein filter combination module adds the first filtered result of the pixel with the second filtered result of the pixel to obtain a pixel of the input image with reduced noise, and
wherein regions which include at least one edge correspond with regions with high activity levels.

* * * * *